United States Patent [19]
Hochreuter

[11] 3,859,378
[45] Jan. 7, 1975

[54] ANTISTATIC FINISHING OF PLASTIC MOLDING MATERIALS

[75] Inventor: Richard Hochreuter, Basel, Switzerland

[73] Assignee: Sandoz Ltd. a/k/a Sandoz AG, Basel, Switzerland

[22] Filed: Sept. 1, 1971

[21] Appl. No.: 177,161

Related U.S. Application Data

[63] Continuation-in-part of Ser. No. 158,517, June 30, 1971, abandoned.

[30] Foreign Application Priority Data

July 6, 1970 Switzerland..................... 10181/70

[52] U.S. Cl. ........ 260/78 S, 260/92.8 A, 260/78 A, 260/78 L, 260/93.5 A, 260/93.7, 260/94.9 GD, 260/404.5

[51] Int. Cl............................................. C08g 20/00

[58] Field of Search ........ 260/78 S, 92.8 A, 93.5 A, 260/93.7, 94.9 GD

[56] References Cited
UNITED STATES PATENTS

| 2,953,420 | 9/1960 | Hees et al. ................................ 8/4 |
| 3,122,504 | 2/1964 | Wedell................................ 252/8.75 |
| 3,230,190 | 1/1966 | Moulton et al. ................... 260/23 H |
| 3,324,091 | 6/1967 | Savides............................. 260/78 S |
| 3,403,117 | 9/1968 | Floyd................................ 260/23 H |

Primary Examiner—Harold D. Anderson
Attorney, Agent, or Firm—Gerald D. Sharkin; Richard E. Vila; Thomas C. Doyle

[57] ABSTRACT

The use for the antistatic finishing of spun or moulded synthetic polymers of substituted or quaternised compounds derived essentially from high molecular fatty acids and polyalkylene polyamines.

10 Claims, No Drawings

ANTISTATIC FINISHING OF PLASTIC MOLDING MATERIALS

This application is a continuation-in-part of application Ser. No. 158,517, filed June 30, 1971, now abandoned.

As is generally known, many plastics including polyolefins, polystyrene, polyamides and polyvinyl chloride, after conversion into fibre, film or moulded products, accumulate static electricity from external forces which creates difficulty in handling and processing.

A number of methods have been suggested to prevent or at least minimize this effect. It is known, for example, that the application of agents with antistatic properties to the surface of fibre prevents it from becoming charged with static electricity, but the protection lasts only until the applied film of the agent is abraded or dissolved during the service life of the product. Durable protection can only be achieved by incorporation in the polymer agents with effective antistatic action which migrate slowly to the surface of the fibre or moulded product and inhibit the accumulation of static electricity over a long period of time. For practical usefulness such an agent should exercise adequate antistatic action when present in small amounts and should not adversely affect the properties of the substrate. In particular it has to show good heat stability and not accelerate the rate of decomposition of the polymer at elevated temperatures.

It has now been found that compounds of the formula

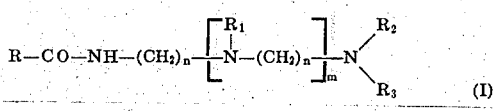

where R—CO— stands for the acyl radical of a saturated or unsaturated high molecular weight fatty acid preferably one containing at least six carbon atoms, $R_1$, $R_2$ and $R_3$ each independently of the others stands for hydrogen or a low molecular weight, unsubstituted or substituted alkyl radical, $m$ for 1 to 3 and $n$ for 3 to 5, and compounds of the formula

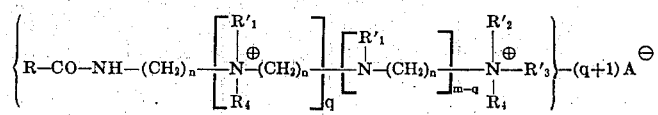

wherein
R—CO— and $m$ are as defined above,
$R_1$, $R_2$, $R_3$ and $R_4$ are lower alkyl,
A is an anion equivalent, and
$q$ is 0 or 1 to $m$,
meet the aforesaid requirements and are highly suitable for the antistatic finishing of products spun or moulded from synthetic polymers.

The present invention thus relates to the use of the compounds of formula (I) for the antistatic finishing of synthetic polymers processed as fibre or moulded products, which comprises incorporating the said compounds in the polymer in amounts of 0.01–5 or preferably 0.1–1 weight percent on the weight of the polymer.

Compounds of formula (I) where RCO— stands for the acyl radical of a fatty acid containing eight to 18 carbon atoms, and $R_1$, $R_2$ and $R_3$ each for hydrogen or a lower carboxyalkyl radical, with at least one of $R_1$, $R_2$ and $R_3$ denoting a lower carboxylalkyl radical of formula

where $s$ is 1 or 2 and Me is a monovalent or multivalent metal ion, e.g. zinc, magnesium, calcium, and the alkali metals, have notably good properties for the antistatic finishing of polyolefins, polystyrene, polyamides and polyvinyl chloride.

For the antistatic finishing of polyamides and polyvinyl chloride those compounds of formula (I) in which R—CO— stands for an acyl radical of a fatty acid which contains eight to 22 carbon atoms and $R_1$, $R_2$ and $R_3$ each stands for methyl or for —CH$_2$—COOMe and Me for an alkali metal, e.g., sodium, potassium, or lithium, have much to commend them.

For polyolefines and specially for polyethylene and polypropylene those compounds of formula (I) where R—CO— stands for the acyl radical of a fatty acid which contains eight to 22 carbon atoms and $R_1$, $R_2$ and $R_3$ each stands for hydrogen or for —($C_2H_4O$)$_p$—H, wherein $p$ is 1 to 5, can be employed with special advantage.

The compounds of formula (I) used in the present invention can be produced by known methods, one of which comprises the reaction, e.g., at 130°–240° C, of 1 mole of a polyalkylene polyamine of formula

wherein $m$ and $n$ as defined above,
with approximately 1 mole, e.g., 0.9–1.2 mols, of a fatty acid of formula R—COOH, if necessary with alkylation using an alkylating agent of low molecular weight.

The carboxylic acids of formula R—COOH may be saturated or unsaturated natural or synthetic fatty acids, which may be branched but preferably have a straight chain and which contain at least six, e.g. seven to 24 or preferably eight to 22, carbon atoms. The following may be named as examples: capric, caproic, lauric, myristic, palmitic, stearic, cocinic, linoleic, oleic and behenic acid.

It is preferable to employ polyalkylene polyamines of formula (II) in which $n$ is 3 or 4 and $m$ is 1 or 2, examples of which are dipropylene triamine, tripropylene tetramine and the corresponding butylene amines, the first-named being of major interest.

Compounds of formula (I) where each of $R_1$, $R_2$ and $R_3$ represents hydrogen or a lower carboxyalkyl radical but at least one stands for a lower carboxyalkyl radical, can be produced by the alkylation of 1 mole of a compound of formula

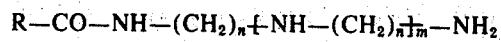

wherein $m$ is 1 to 3 and $n$ is 3 to 5,
with 1 to maximum ($m$+2) moles of lower halogenalkylcarboxylic acid such as chloracetic, bromacetic or β-chloropropionic acid, or a lower unsaturated, e.g., α,β-unsaturated, carboxylic acid such as acrylic, methacrylic or crotonic acid. it is advisable to prepare these compounds in the form of the sodium or potassium salts as these show better storage stability and give very good results in application.

Compounds of formula (I) in which $R_1$, $R_2$ and/or $R_3$ stand for $-(C_xH_{2x}O)_p-H$ wherein $x$ is 2 to 4 and $p$ is 1 to 5, are formed by alkylation of compounds of formula (III), e.g., with alkylene oxides of formula $C_xH_{2x}O$ such as ethylene oxide, 1,2-propylene oxide or 1,2-butylene oxide.

For the formation of compounds of formula (I) in which $R_1$, $R_2$ and/or $R_3$ represent lower unsubstituted alkyl such as methyl or ethyl, compounds of formula (III) are reacted with known alkylating agents such as the alkyl esters of strong inorganic acids, for instance dialkyl sulphates (dimethyl or diethyl sulphate) or alkyl halides (methyl chloride). If in preparing compound (I) the alkylating agent is employed in excess peralkylation may take place giving compounds which have the formula

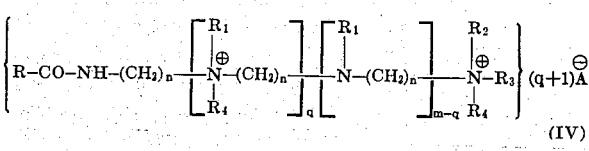

(IV)

where $m$ is 1 to 3 and $n$ is 3 to 5 and $R_4$ represents an alkyl radical, A an anion equivalent and $q$ is zero or 1 to $m$.

These alkylating reactions are accomplished by the known methods at temperatures ranging from about 20° C to 140° C in the presence or absence of alkali, if necessary with the addition of a solvent.

For the aforedescribed process of production it will be evident that the compounds of formula (I) which are effective for the claimed use are not invariably obtained as chemical entities but often as mixtures.

The plastics which are primarily suitable for antistatic finishing according to this invention are the thermoplasts, which include the polyamides, polystyrene, polyvinyl chloride and polyolefins such as are obtained by the high- and low-pressure polymerization of ethylene, propylene, butene-(1) or pentene-(1).

Several methods are available for incorporating compounds of formula (I) in plastics. They can be dissolved, suspended or emulsified in a solvent such as ethanol, trichloroethylene, toluene or benzene and mixed with the polymer powder with vigorous stirring, the solvent being subsequently eliminated by distillation or some other suitable means. Alternatively, the compound can be added to the heated polymer melt with thorough mechanical stirring and if necessary the application of pressure, or it can be incorporated in the polymer on a roller mill or in an extruder, as for injection moulded goods.

It is of advantage to mix the amount of the compound of formula (I) calculated for a batch of moulding material in a small amount of the polymer and to use this concentrated mixture for finishing the batch. Similarly it is of advantage to prepare such concentrated mixtures for storage to be used as required. They can be incorporated in the batch with or without the addition of solvent.

Antistatic finishing as described in this invention is applicable with every type of product made from synthetic polymers, whether mouldings, film, sheet, filament or fibre. If desired the disclosed antistatic compounds can be added in the preforming of plastics materials, which can then be stored in the antistatically finished state, with the advantage that they do not become charged or appreciably charged with static electricity in further handling and processing, e.g., loading into containers, transportation, and passage through spinning or moulding machinery.

Following incorporation of the antistatic compound the materials can be processed by standard methods such as injection or extrusion mouldings, spinning or calendering. In addition they may contain other commonly used additives such as plasticizers, dyes, pigments, lubricants or fillers.

The compounds of formula (I) have good antistatic action and are very stable to heat. The antistatic protection imparted to the finished products remains effective over a long period of time. They retain their original colour and transparency and show no tendency to exudation or stickiness.

The antistatic behavior of mouldings finished according to this invention was tested by measuring the surface resistance at 65 % relative humidity and 22° C as specified in German Industrial Standard 53482.

In the following Examples the parts and percentages are by weight and the temperatures in degrees centigrade.

EXAMPLE 1

400 Parts of "Lupolene 2430-H" (registered trade mark), a low density polyethylene with melt index 1.2–1.7, are mixed with 0.4 parts of a product formed by the condensation reaction of 96.3 parts of capric acid and 65.5 parts of dipropylene triamine at 130°–170°.

After 20 minutes a homogeneous mixture is obtained which is injection moulded as panels of 1 mm thickness. The panels are stored for 48 hours at 22° and 65% relative humidity, after which the surface resistance is measured. The value is $10^{9.2}$ Ohms. In the absence of the stated additive the surface resistance of this grade of polyethylene is $10^{12}$ Ohms.

After ageing for 16 days at 100° the polyethylene containing the disclosed antistatic agent shows no discoloration, in contrast to an otherwise identical panel without the incorporated agent.

This procedure can be employed with 400 parts of polypropylene ("Carlona PM-61," registered trade mark, melt index 5.0) in place of polyethylene and 2 parts of the aforestated condensation product, the conditions being otherwise the same. The moulded panel finishing with the antistatic compound has a surface resistance of $10^{9.3}$ Ohms as compared with $10^{13}$ Ohms for one without the additive.

EXAMPLE 2

In place of the condensation product used in the preceding Example, an amide obtained by reaction of 100 parts of lauric acid with 58 parts of dipropylene triamine at 150–170° can be incorporated in Lupolene 1810-H in an amount of 0.1% on the weight of the batch. Measured under the same conditions as in Example 1, the surface resistance of a moulding made of this antistatically treated material is $10^8$ Ohms.

EXAMPLE 3

500 Parts of polyamide 6 ("Grilon-A-25," registered trade mark) are homogeneously mixed with 2.5 parts of a product which is formed by the condensation of 100 parts of lauric acid and 58.5 parts of dipropylene triamine at 150°–210° and subsequent alkylation with 58 parts of the sodium salt of monochloroacetic acid at 80° in the presence of sodium hydroxide, the product being obtained in the form of the sodium salt. The mixture is injection moulded as panels of 1 mm thickness. The surface resistance is measured as in Example 1, the values being $10^9$ Ohms and $10^{11}$ Ohms, respectively for the panels with and without the incorporated antistatic agent.

EXAMPLE 4

400 Parts of polyvinyl chloride ("Basis Solvic 229," registered trade mark) are homogeneously mixed on a laboratory roller mill with 2 parts of a product which is produced by condensation of 112 parts of lauric acid and 58.5 parts of dipropylene triamine at 150°–210° and subsequent alkylation with 116.5 parts of the sodium salt of chloroacetic acid at 78°–80° in the presence of sodium hydroxide, and is obtained in the form of the sodium salt. The mixture is injection moulded as panels of 1 mm thickness, which are measured for surface resistance as given in Example 1. The value is $10^{10.8}$ Ohms for the antistatically finished panel as compared with $10^{12.2}$ for one without the stated additive.

Comparable results are obtained when a product produced with 174 parts of chloroacetic acid (sodium salt) in place of 116.5 finished parts of chloroacetic acid (sodium salt) is used as antistatic agent.

The incorporated antistatic agent does not cause a change of colour in the polyvinyl chloride. After storage for 6 months the antistatically fininshed panels show no tendency to exudation or stickiness.

The 400 parts of polyvinyl chloride can be replaced by 400 parts of polystyrene (HF 77, Monsanto), this being mixed on the roller mill with 6 parts of the product obtained as given in the first paragraph of this Example, The surface resistance of 1 mm thick panels injection moulded with this material is $10^{8.8}$ Ohms as compared with $10^{13}$ Ohms for a panel of the same polystyrene grade containing no antistatic agent.

EXAMPLE 5

On a roller mill 500 parts of polyvinyl chloride ("Lonza EN," registered trade mark) are homogeneously blended with 2.5 parts of a product which is formed by condensation of 172.5 parts of capric acid and 117 parts of dipropylene triamine at 150°–210° followed by methylation with 189 parts of dimethyl sulphate at 80°. The mixture is injection moulded as 1 mm thick panels. The surface resistance is measured as in Example 1; it is $10^{8.5}$ Ohms as compared with $10^{12}$ Ohms for a panel without the incorporated antistatic agent.

EXAMPLE 6

400 Parts of polyvinyl chloride ("Basis Solvic 229," registered trade mark) are homogeneously mixed on a roller mill with 2 parts of a product formed by condensation of 112 parts of lauric acid with 58.3 parts of dipropylene triamine at 150°–190°, subsequent alkylation with a solution of 142 parts of monochloroacetic acid in 1,050 parts of 16% potassium hydroxide solution at 80°, and final distillation of the water. The mixture is injection moulded as panels of 1 mm thickness. The surface resistance measured as in Example 1 is $10^{8.7}$ Ohms as against $10^{13.5}$ Ohms for a panel without the stated additive.

Products with particularly good heat stability are obtained when in place of the potassium salt the corresponding magnesium or zinc salt is employed, which can be produced, for example, by the addition of an aqueous solution of 28.5 parts of magnesium chloride or 40.8 parts of zinc chloride to 538 parts of the aforementioned aqueous solution of the potassium salt.

EXAMPLE 7

On a roller mill 300 parts of polyvinyl chloride ("Lonza SN 60," registered trade mark) are homogeneously mixed with 1.5 parts of a product which is formed by condensation of 141 parts of oleic acid with 57 parts of dipropylene triamine and subsequent alkylation with 58 parts of monochloroacetic acid (sodium salt) in the presence of sodium hydroxide solution and is obtained as the sodium salt. Panels 1 mm thick are injection moulded with the mixture. The surface resistance measured as in Example 1 is $10^{8.8}$ Ohms as compared with $10^{11}$ Ohms for a panel containing no antistatic agent.

In place of 58 parts of monochloroacetic acid (sodium salt), 65 parts of monochloropropionic acid (sodium salt) can be used for alkylating the aforementioned condensation product, the resulting compound having comparable properties.

EXAMPLE 8

400 Parts of polyvinyl chloride are homogeneously mixed on a roller mill with 2 parts of a product formed by condensation of 86 parts of technical capric acid with 65 parts of dipropylene triamine and subsequent alkylation with 126 parts of monochloroacetic acid (sodium salt) in the presence of sodium hydroxide solution, the product being in the form of the sodium salt. The mixture is injection moulded as panels of 1 mm thickness. The surface resistance of these is $10^{8.7}$ Ohms and $10^{11}$ Ohms without the incorporated antistatic agent.

having thus disclosed the invention, what we claim is:

1. A composition consisting essentially of a synthetic plastic polymer which is selected from the group consisting of polyamides, polystyrene, polyvinyl chloride, and polyolefins and which has a tendency to accumulate static electricity and, incorporated therein, 0.01 to 5% by weight of the polymer of an antistatic compound of the formula

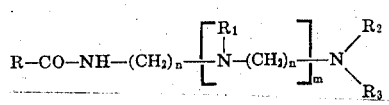

wherein
R—CO is the acyl radical of a fatty acid of eight to 18 carbon atoms,
$R_1$, $R_2$, and $R_3$ are, independently, hydrogen or lower carboxyalkyl, provided that at least one of $R_1$, $R_2$ and $R_3$ is a lower carboxyalkyl radical of the formula

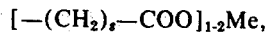

$s$ is 1 or 2,
Me is a monovalent or multivalent metal ion,
$m$ is 1 to 3,
and
$n$ is 3 to 5.

2. A composition according to claim 1 wherein the antistatic compound is present in an amount of 0.1 to 1% by weight of the polymer.

3. A composition according to claim 1 wherein the antistatic compound is a compound of the formula

C$_{11}$H$_{23}$CONH(CH$_2$)$_3$NH(CH$_2$)$_3$NHCH$_2$COONa and the polymer is a polyamide.

4. A composition according to claim 1 wherein the antistatic compound is a compound of the formula

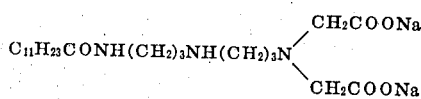

and the polymer is polyvinyl chloride.

5. A composition according to claim 1 wherein the antistatic compound is a compound of the formula

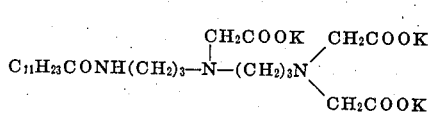

and the polymer is polyvinyl chloride.

6. A composition according to claim 1 wherein the antistatic compound is a compound of the formula

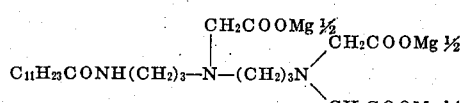

and the polymer is polyvinyl chloride.

7. A composition according to claim 1 wherein the antistatic compound is a compound of the formula

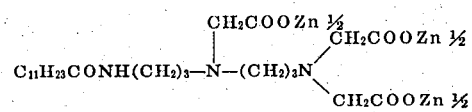

and the polymer is polyvinyl chloride.

8. A composition according to claim 1 wherein the antistatic compound is a compound of the formula

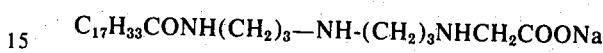

C$_{17}$H$_{33}$CONH(CH$_2$)$_3$—NH-(CH$_2$)$_3$NHCH$_2$COONa and the polymer is polyvinyl chloride.

9. A composition according to claim 1 wherein the antistatic compound is a compound of the formula

C$_{17}$H$_{33}$CONH(CH$_2$)$_3$NH(CH$_2$)$_3$NHCH$_2$CH$_2$COONa and the polymer is polyvinyl chloride.

10. A composition according to claim 1 wherein the antistatic compound is a compound of the formula

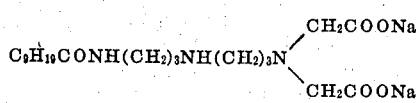

and the polymer is polyvinyl chloride.

* * * * *